US012118357B2

(12) United States Patent
Arunachalam et al.

(10) Patent No.: US 12,118,357 B2
(45) Date of Patent: Oct. 15, 2024

(54) ENCODED DATA DEPENDENCY MATRIX FOR POWER EFFICIENCY SCHEDULING

(71) Applicant: Advanced Micro Devices, Inc., Santa Clara, CA (US)

(72) Inventors: Rajesh Kumar Arunachalam, Santa Clara, CA (US); Manivannan Bhoopathy, Santa Clara, CA (US); Hon-Hin Wong, Santa Clara, CA (US); Scott Thomas Bingham, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/855,621

(22) Filed: Jun. 30, 2022

(65) Prior Publication Data
US 2024/0004657 A1    Jan. 4, 2024

(51) Int. Cl.
*G06F 9/30*    (2018.01)
*G06F 9/38*    (2018.01)

(52) U.S. Cl.
CPC ........ *G06F 9/30145* (2013.01); *G06F 9/3838* (2013.01)

(58) Field of Classification Search
CPC ............................ G06F 9/3838; G06F 9/30145
See application file for complete search history.

(56) References Cited

U.S. PATENT DOCUMENTS

| 6,065,105 | A | 5/2000 | Zaidi et al. |
| 6,334,182 | B2 | 12/2001 | Merchant et al. |
| 2014/0344554 | A1 | 11/2014 | Abdallah |
| 2016/0179552 | A1 | 6/2016 | Wong et al. |
| 2019/0163482 | A1 | 5/2019 | Silberman et al. |
| 2019/0377599 | A1* | 12/2019 | Abhishek Raja ..... G06F 9/3887 |

OTHER PUBLICATIONS

Sassone, et al. "Matrix Scheduler Reloaded," Intel Microarchitecture Research Lab (MRL), Austin TX, 2007.
Goshima, et al. "A high-speed dynamic instruction scheduling scheme for superscalar processor," Kyoto University, 2001.
International Search Report and Written Opinion from corresponding International Application No. PCT/ US2023/069354, dated Oct. 19, 2023 (7 pages).

* cited by examiner

*Primary Examiner* — Zachary K Huson
(74) *Attorney, Agent, or Firm* — Greenberg Traurig, LLP

(57) ABSTRACT

The disclosed system may include a processor configured to encode, using an encoding scheme that reduces a number of bits needed to represent one or more instructions from a set of instructions in an instruction buffer represented by a dependency matrix, a dependency indicating that a child instruction represented in the dependency matrix depends on a parent instruction represented in the dependency matrix. The processor may also be configured to store the encoded dependency in the dependency matrix and dispatch instructions in the instruction buffer based at least on decoding one or more dependencies stored in the dependency matrix for the instructions. Various other methods, systems, and computer-readable media are also disclosed.

20 Claims, 5 Drawing Sheets

200

|  | Col 1 | Col 2 | Col 3 | Col 4 | Col 5 | Col 6 | Col 7 | Col 8 |
|---|---|---|---|---|---|---|---|---|
| Row 1 |  |  |  |  | ■ |  |  | ■ |
| Row 2 | ■ |  |  |  |  |  |  |  |
| Row 3 | ■ | ■ |  |  |  |  |  |  |
| Row 4 | ■ |  | ■ |  |  |  |  |  |
| Row 5 |  |  |  |  |  |  |  |  |
| Row 6 |  |  | ■ |  |  |  |  |  |
| Row 7 |  | ■ |  |  |  |  |  |  |
| Row 8 |  |  |  |  |  |  |  |  |

ENCODED DATA DEPENDENCY MATRIX FOR POWER EFFICIENCY SCHEDULING

BACKGROUND

A computing device may include a processor for executing instructions from program code such as firmware, an operating system, an application, etc. The processor may read the instructions from the program code as macro-instructions. To execute the macro-instructions, the processor may first decode each macro-instruction into micro-operations that may form processor-level operations for the macro-instruction. For example, an ADD macro-instruction may be decoded into micro-operations (pops or uops) that may cause a processor to perform specific parts of the ADD operation, such as acquiring/loading data, adding the data together, storing a result of the addition, etc. The processor may perform each micro-operation to execute the corresponding macro-instruction.

Although a processor may perform micro-operations in order (e.g., in an order based on the decoding of a macro-instruction), some processors may improve processing efficiency by performing micro-operations out of order. Performing micro-operations out of order may reduce latency associated with waiting on a particular micro-operation (that may be waiting on a particular resource) by performing a different micro-operation rather than waiting. For example, a processor may perform a ready micro-operation (e.g., a micro-operation that is not waiting on any resources) before an older micro-operation that may not be ready.

The processor may include a scheduler to facilitate scheduling which micro-operations are to be dispatched (e.g., sent to execution units in the processor to perform the micro-operations). Decoded micro-operations may be forwarded to the scheduler to be queued in a buffer. When an execution unit is available for executing micro-operations, the scheduler may pick a ready micro-operation to send to the available execution unit.

A micro-operation may depend on another micro-operation for resources. In the ADD example, an addition micro-operation (e.g., a consumer operation in this example) may depend on a prior load/store micro-operation (e.g., a producer operation in this example) to have completed loading the data to be added into registers (e.g., a fast local storage on a processor). In other words, a consumer operation may be ready when all of its producer operations have completed. To facilitate determining whether a micro-operation's dependencies have resolved, the scheduler may track which micro-operations depend on which other micro-operations using a dependency matrix. The dependency matrix may track which micro-operations in the scheduler's buffer depend on which other micro-operations in the scheduler's buffer.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 2 is a diagram of an exemplary dependency matrix.

FIG. 4 is a diagram of a full encoding scheme for a dependency matrix.

Figure 1:
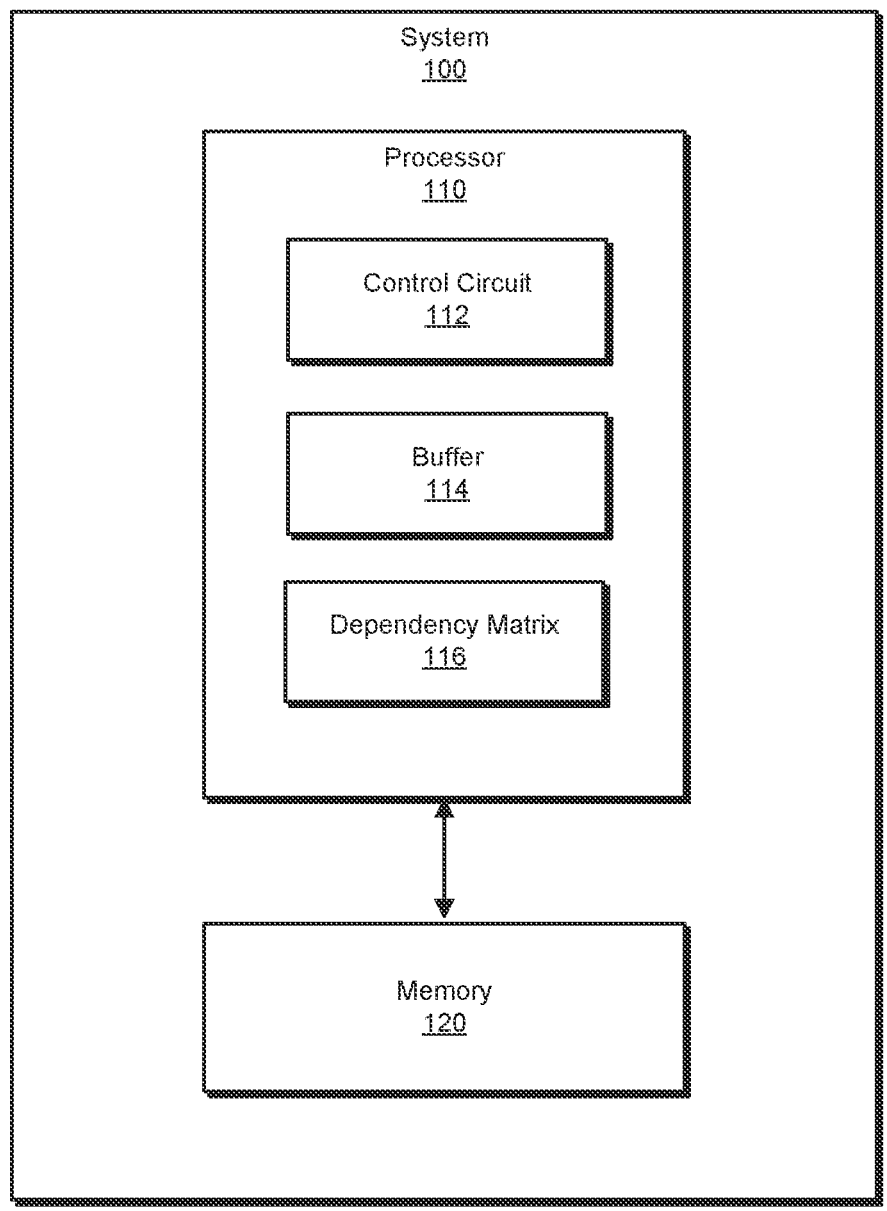
FIG. 1 is a block diagram of an exemplary system for an encoded dependency matrix for scheduling instructions.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

As will be described in greater detail below, the present disclosure describes systems and methods for encoding dependency matrices for more efficient scheduling of instructions for a processor. In one example, a method for encoding dependency matrices may include encoding, using an encoding scheme, a dependency indicating that a newly allocated instruction to an instruction buffer represented by a dependency matrix depends on another instruction in the instruction buffer. The method may also include storing the encoded dependency in the dependency matrix. The method may further include dispatching the instructions in the instruction buffer based at least on decoding one or more dependencies stored in the dependency matrix for the instructions. The dispatching may further be based on identifying a readiness of each of the decoded dependencies.

In one example, a method for encoding dependency matrices may include encoding, using an encoding scheme, a first dependency indicating that a first instruction represented in a dependency matrix depends on a second instruction represented in the dependency matrix. The method may also include storing the encoded first dependency in the dependency matrix. The method may further include dispatching the first instruction based at least on decoding one or more dependencies stored in the dependency matrix for the first instruction. In some examples, the dispatching may be further based on identifying a readiness of each of the decoded dependencies.

In some examples, the encoding scheme may correspond to a partial encoding scheme that divides a set of instructions represented by the dependency matrix into groups and represents a source instruction of a dependency using a group value that may correspond to a group containing the source instruction and an index value that may correspond to the source instruction within the group. In some examples, decoding a dependency may include identifying, using the group value, the group that contains the source instruction and identifying, using the index value, which instruction in the identified group corresponds to the source instruction.

In some examples, the encoding scheme may correspond to a full encoding scheme that represents a source instruction of a dependency using a location value that may correspond to an index location of the source instruction in the dependency matrix. In some examples, decoding a dependency may include identifying, using the location value, the source instruction.

In some examples, the method may include encoding a second dependency that may indicate that the newly allocated instruction to the instruction buffer depends on two instructions represented in the dependency matrix. In some examples, the method may include encoding a second dependency that may indicate that the first instruction depends on a third instruction represented in the dependency matrix. The method may further include storing the encoded second dependency in the dependency matrix. The second dependency may be encoded with a second encoding scheme different from the encoding scheme. In some examples, the encoding scheme may include a special value indicating no dependency.

In one example, a method for encoding dependency matrices may include storing a newly allocated instruction in a buffer for queueing instructions. The newly allocated instruction may depend on another instruction in the buffer. The method may also include encoding, using an encoding scheme that reduces a number of bits needed to represent one or more instructions from a set of instructions in the buffer, a dependency indicating that a child instruction represented in the dependency matrix depends on a parent instruction represented in the dependency matrix. The method may further include storing the encoded dependency in a dependency matrix. In addition, the method may include dispatching instructions in the instruction buffer based at least on decoding one or more dependencies stored in the dependency matrix for the instructions. The dispatching may further be based on identifying a readiness of each of the decoded dependencies. In some examples, an index location in the dependency matrix may correspond to a buffer location in the buffer.

In one example, a method for encoding dependency matrices may include storing a first instruction in a buffer for queueing instructions. The first instruction may depend on a second instruction in the buffer. The method may also include encoding, using an encoding scheme that reduces a number of bits needed to represent one or more instructions from a set of instructions in the buffer, a first dependency indicating that the first instruction depends on the second instruction. The method may further include storing the encoded first dependency in a dependency matrix. In addition, the method may include dispatching the first instruction based at least on decoding one or more dependencies stored in the dependency matrix for the first instruction. In some examples, the dispatching may further be based on identifying a readiness of each of the decoded dependencies. In some examples, an index location in the dependency matrix may correspond to a buffer location in the buffer.

In some examples, the encoding scheme may correspond to a partial encoding scheme that divides the set of instructions into groups and represents a source instruction of a dependency using a group value that corresponds to a group containing the source instruction and an index value that corresponds to the source instruction within the group. In some examples, decoding a dependency may include identifying, using the group value, the group that contains the source instruction, and identifying, using the index value, which instruction in the identified group corresponds to the source instruction.

In some examples, the encoding scheme may correspond to a full encoding scheme that represents a source instruction of a dependency using a location value corresponding to a buffer location of the source instruction in the buffer. In some examples, decoding a dependency may include identifying, using the location value, the source instruction.

In one example, a system for encoding dependency matrices may include a physical memory, and at least one physical processor. The physical processor may include a buffer for queueing instructions, a dependency matrix for tracking dependencies between instructions in the buffer, and a control circuit for identifying ready instructions in the buffer using the dependency matrix. In some examples, the control circuit may be configured to encode, using an encoding scheme that reduces a number of bits needed to represent one or more instructions from a set of instructions in the buffer, a dependency indicating that a new instruction allocated and/or written into the buffer depends on another instruction in the buffer represented in the dependency matrix. The control circuit may also be configured to store the encoded dependency in the dependency matrix in an index location corresponding to a buffer location of the first instruction in the buffer. The control circuit may further be configured to dispatch instructions in the instruction buffer based at least on decoding one or more dependencies stored in the dependency matrix for the instructions.

In one example, a system for encoding dependency matrices may include a physical memory, and at least one physical processor. The physical processor may include a buffer for queueing instructions, a dependency matrix for tracking dependencies between instructions in the buffer, and a control circuit for identifying ready instructions in the buffer using the dependency matrix. In some examples, the control circuit may be configured to encode, using an encoding scheme that reduces a number of bits needed to represent one or more instructions from a set of instructions in the buffer, a first dependency indicating that a first instruction in the buffer depends on a second instruction in the buffer. The control circuit may also be configured to store the encoded first dependency in the dependency matrix in an index location corresponding to a buffer location of the first instruction in the buffer. The control circuit may further be configured to dispatch the first instruction based at least on decoding one or more dependencies stored in the dependency matrix for the first instruction. In some examples, the dispatching may further be based on identifying a readiness of each of the decoded dependencies.

Features from any of the above-mentioned implementations may be used in combination with one another in accordance with the general principles described herein. These and other implementations, features, and advantages will be more fully understood upon reading the following detailed description in conjunction with the accompanying drawings and claims.

The present disclosure is generally directed to an encoded dependency matrix. Although increasing a size of the scheduler's buffer may provide certain performance benefits, the corresponding dependency matrix may accordingly increase in size. Because the dependency matrix may be implemented with a physical circuit, there may be additional considerations, such as power, heat, area on die, for a larger dependency matrix. As will be explained in greater detail below, implementations of the present disclosure may encode a dependency using an encoding scheme. The dependency may indicate that a child instruction represented in the dependency matrix depends on a parent instruction represented in the dependency matrix. The encoding scheme may reduce a number of bits needed to represent one or more instructions from a set of instructions represented by the dependency matrix. The encoded dependency may be stored in the dependency matrix. To determine whether an instruction is ready for dispatch, the implementations of the present disclosure may decode one or more dependencies stored in the dependency matrix for the given instruction and identify a readiness of each of the decoded dependencies.

Features from any of the implementations described herein may be used in combination with one another in accordance with the general principles described herein.

These and other implementations, features, and advantages will be more fully understood upon reading the following detailed description in conjunction with the accompanying drawings and claims.

The following will provide, with reference to FIGS. 1-5, detailed descriptions of various implementations of encoding schemes for dependency matrices. Detailed descriptions of an example system for encoding dependency matrices are provided in connection with FIG. 1. Detailed descriptions of various encoding schemes for dependency matrices are provided in connection with FIGS. 2-4, including descriptions of a partial encoding scheme (e.g., FIG. 3) and a full encoding scheme (e.g., FIG. 4). Detailed descriptions of an example method for encoding dependency matrices are provided in connection with FIG. 5.

FIG. 1 is a block diagram of an example system 100 for an encoded dependency matrix. System 100 may correspond to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 may access and/or modify data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), portions of one or more of the same, variations or combinations of one or more of the same, and/or any other suitable physical processor.

In some implementations, the term "instruction" may refer to computer code that may be read and executed by a processor. Examples of instructions may include, without limitation, macro-instructions (e.g., program code that may require a processor to decode into processor instructions that the processor may directly execute) and micro-operations (e.g., low-level processor instructions that may be decoded from a macro-instruction and that form parts of the macro-instruction).

As further illustrated in FIG. 1, processor 110 includes a control circuit 112, a buffer 114, and a dependency matrix 116. Control circuit 112 may correspond to a scheduler and may include circuitry and/or instructions for scheduling instructions for dispatch. Buffer 114 may correspond to a local storage of processor 110 for queuing instructions before dispatch, and may have a buffer size N (e.g., buffer 114 may queue up to N instructions). Dependency matrix 116 may correspond to a dependency matrix for tracking which instructions in buffer 114 depends on which other instructions in buffer 114.

In some examples, processor 110 (and/or a functional unit thereof) can read program instructions from memory 120 and decode the read program instructions into micro-operations. Processor 110 (and/or a functional unit thereof) can forward the newly decoded micro-operations to control circuit 112. Control circuit 112 can store the decoded micro-operations in buffer 114 and update dependency matrix 116 to reflect the newly queued micro-operations and dependencies. When an execution unit of processor 110 is available to execute a micro-operation (which in some examples may be broadcast in an N-wide format presenting an updated status for the N instructions in buffer 114), control circuit 112 can pick a ready micro-operation from buffer 114 and dispatch it to the available execution unit. To determine whether a micro-operation in buffer 114 is ready, control circuit 112 can access dependency matrix 116 to identify the micro-operation's dependencies and determine whether these dependencies have been resolved (e.g., whether the corresponding micro-operations have completed). If the dependencies have been resolved, control circuit 112 can pick the micro-operation for dispatch, and accordingly update buffer 114 and dependency matrix 116 (e.g., by removing or otherwise flushing the associated entries).

FIG. 2 illustrates a dependency matrix 200 (that may correspond to dependency matrix 116) for tracking dependencies between instructions. An instruction (e.g., consumer) may depend on a second instruction (e.g., producer) when the instruction uses a value that will not be known until the second instruction is complete. For example, the instruction may perform an operation on a result of the second instruction. More specifically, the instruction may perform the operation using a value in a register that will be updated by the second instruction. Because a consumer relies on values from its producers, a consumer may not be ready for dispatch until its producers have finished execution. Dependency matrix 200 may therefore track dependencies between instructions to facilitate tracking when an instruction is ready.

Dependency matrix 200 can track dependencies between instructions stored in a buffer (e.g., buffer 114) or other similar queue structure that may queue instructions for out-of-order execution as described herein. In some examples, dependency matrix 200 can follow an indexing of the buffer. For example, row 1 of dependency matrix 200 may refer to instruction 1 in the buffer. Thus, a number of rows of dependency matrix 200 may correspond to a size of the buffer.

In FIG. 2, each column of dependency matrix 200 can also correspond to each instruction in the buffer, following the same indexing. Each row of dependency matrix 200 may therefore indicate the dependencies for the corresponding instruction (e.g., consumer) by marking the appropriate columns (e.g., producers). For example, in FIG. 2, row 1 has marks in column 5 and column 8 to indicate that instruction 1 (in the buffer) depends on instruction 5 and instruction 8. As seen in FIG. 2, instructions can depend on any number of other instructions, such as 0, 1, 2, 3, etc.

In some examples, dependency matrix 200 can be implemented with a physical circuit that may maintain values (e.g., a bit based on a stored electrical charge) for each matrix element. FIG. 2 illustrates dependency matrix 200 for a buffer size N of 8 instructions. Because of the 1-to-1 correspondence between the rows and the buffer size as well as the columns and the buffer size, dependency matrix 200 may have an N×N size (e.g., 8×8). As the buffer size increases, dependency matrix 200 may accordingly increase quadratically or exponentially. Because dependency matrix 200 can be implemented with a circuit, the size of dependency matrix 200 may grow to be prohibitively large when considering an area needed for dependency matrix 200 in a processor, the timing required to update dependency matrix 200, and the power consumption and heat dissipation required to operate dependency matrix 200.

The present disclosure provides various encoding schemes that may reduce a size of a dependency matrix. As described above, a dependency matrix may have an N×N size for N instructions. An instruction may typically depend on a few other instructions at most (e.g., often three or fewer, which may also be less than N), such that each row in the dependency matrix may be mostly empty. Therefore, the dependency matrix may be a sparse matrix and suitable for efficient encoding or other similar compression. To maintain a 1-to-1 relationship with an instruction buffer, a number of rows in a dependency matrix may remain unchanged. Therefore, reducing a size of the dependency matrix may include reducing a number of columns according to a partial and/or full encoding scheme as described herein. Moreover, although the present disclosure refers to rows and columns of the dependency matrix, in other examples, the matrix dimensions may be swapped (e.g., reducing the number of rows while maintaining the number of columns, referencing instructions using columns rather than rows, etc.).

Figure 3:
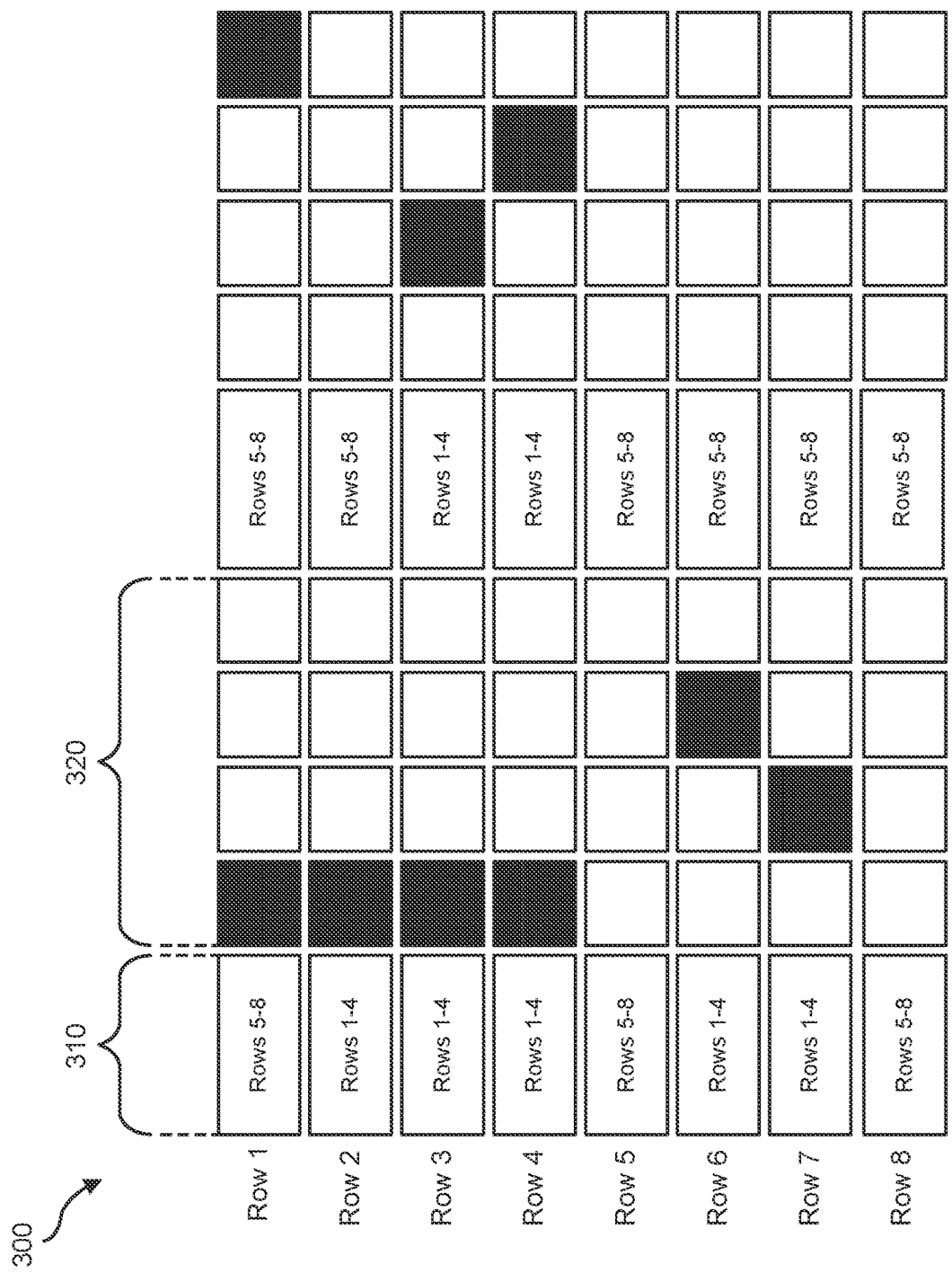
FIG. 3 is a diagram of a partial encoding scheme for a dependency matrix.

FIG. 3 illustrates a dependency matrix 300, which may correspond to dependency matrix 116, using a partial encoding scheme. Similar to dependency matrix 200, dependency matrix 300 can include a number of rows (e.g., 8) corresponding to the number of instructions that may be stored in the buffer. The total set of instructions can be divided into groups that can be identified via a group value 310. Within each group, a particular instruction can be identified via an index value 320.

For example, in FIG. 3, the 8 instructions can be divided into two groups (e.g., "rows 1-4" and "rows 5-8"). Group value 310 can identify a particular group based on a bit corresponding to each group (e.g., a first bit for "rows 1-4" and a second bit for "rows 5-8"), or can identify a particular group based on an identification value (e.g., using a predetermined number of bits to store a binary number or a vector, each group being associated with a different number value). Index value 320 can identify a specific instruction within a group, for instance by using a bit corresponding to each index position, although in other examples this index value may use an encoded value as well.

As illustrated in FIG. 3, instruction 1 (e.g., row 1) can have two dependencies. The first dependency may correspond to an instruction from "rows 5-8," as indicated by the first group value 310. The first index value 320 indicates the first instruction from the group, which is row 5. The second dependency identifies row 8 (e.g., the fourth instruction in "rows 5-8"). Thus, instruction 1 depends on instruction 5 and instruction 8.

In some examples, a special value or default value can indicate no dependency. For instance, row 5 can use a default value for group value 310 (e.g., defaulting to "rows 5-8") and a special value for index value 320 (e.g., a blank value). In other examples, other special values may be used, such as values having all bits as empty, all bits as filled, etc.

FIG. 3 illustrates a simple example of 8 instructions divided into two groups in order to explain the partial decoding scheme. Although the particular example shown in FIG. 3 may not necessarily reduce a number of columns from that of dependency matrix 200, the number of columns can be further reduced by increasing a number of groups. In addition, the column reduction can be more pronounced as the number of instructions increases. For example, for a buffer capable of holding 100 instructions, a 100×100 dependency matrix may be needed if using the scheme illustrated in FIG. 2. However, dividing the instructions into 4 groups of 25 instructions may use 4 bits for group value 310 (e.g., one bit for each group) and 25 bits for index value 320 (e.g., one bit for each instruction in a group) such that each dependency may be encoded with 29 bits. With two dependencies, the dependency matrix size may be 100×58. The matrix size may be further adjusted by adjusting a number of groups and by further encoding group value 310 and/or index value 320.

Figure 4:
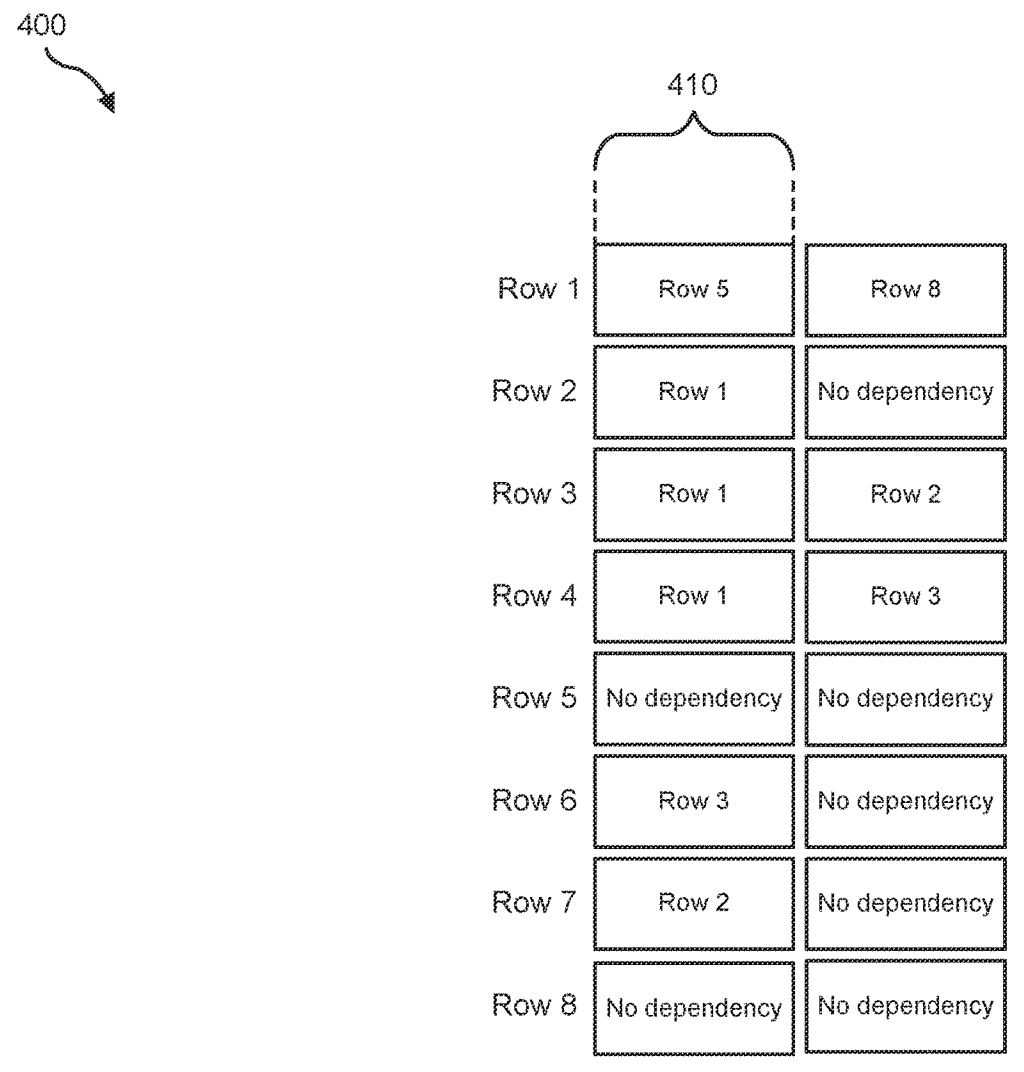

FIG. 4 illustrates a dependency matrix 400 (which may correspond to dependency matrix 116) using a full encoding scheme. Similar to dependency matrix 200 and dependency matrix 300, dependency matrix 400 can include a number of rows (e.g., 8) corresponding to the number of instructions that may be stored in the buffer. Each instruction can be identified by encoding its index or buffer location in the buffer to a location value 410.

For example in FIG. 4, each dependency can be stored in a vector or series of bits that can include, for example, a binary number that may uniquely identify each instruction in the buffer. Row 1 (e.g., instruction 1) depends on row 5 and row 8 as indicated by the corresponding location values 410. As seen in FIG. 4, no dependency may be indicated by a special value.

FIG. 4 illustrates a simple example of 8 instructions in order to explain the full decoding scheme. The number of columns can be reduced from that of dependency matrix 200 (and in some examples, dependency matrix 300) when the number of bits needed for two location values 410 is less than a total number of instructions. In addition, the column reduction may be more pronounced as the number of instructions increases. For example, for a buffer capable of holding 100 instructions, a 100×100 dependency matrix may be needed if using the scheme illustrated in FIG. 2. However, encoding 100 index locations may require at least a 7-bit vector (e.g., $2^7=128$ to ensure a unique value for each index location). With two dependencies, the dependency matrix size may be 100×14.

Moreover, in some examples a hybrid encoding scheme can be used, in which the partial encoding scheme may incorporate aspects of the full encoding scheme and/or vice versa. In yet other examples, certain dependency entries (e.g., the first dependency) may be encoded with one encoding scheme and other dependency entries (e.g., the second dependency) may be encoded with a different encoding scheme.

Figure 5:
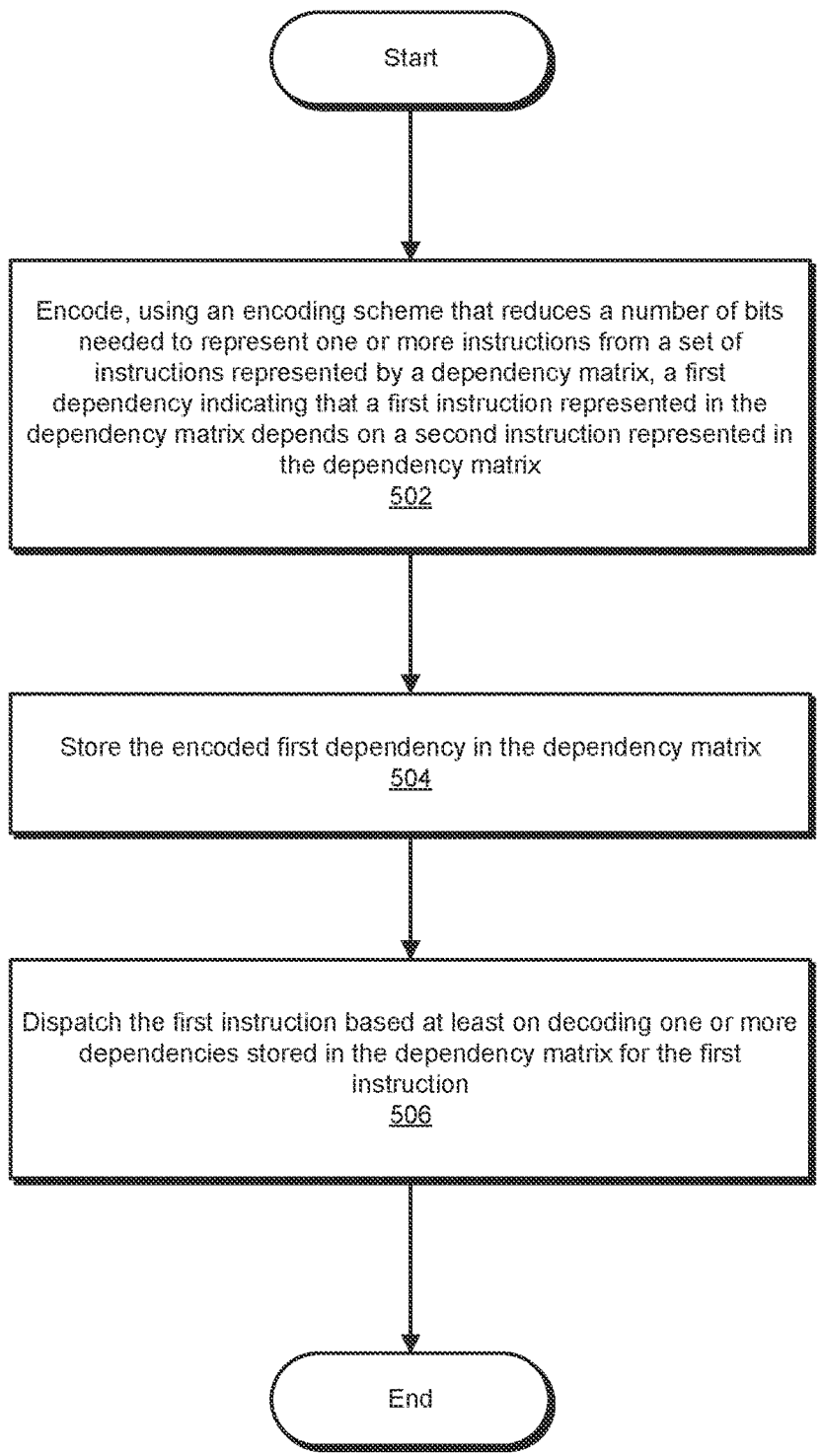
FIG. 5 is a flow diagram of an exemplary method for encoding a dependency matrix for scheduling instructions.

FIG. 5 is a flow diagram of an exemplary computer-implemented method 500 for encoding a dependency matrix. The steps shown in FIG. 5 can be performed by any suitable computer-executable code and/or computing system, including the system illustrated in FIG. 1. In one example, each of the steps shown in FIG. 5 can represent an algorithm whose structure includes and/or is represented by multiple sub-steps, examples of which will be provided in greater detail below.

As illustrated in FIG. 5, at step 502 one or more of the systems described herein may encode, using an encoding scheme that reduces a number of bits needed to represent one or more instructions from a set of instructions represented by a dependency matrix, a first dependency indicating that a first instruction represented in the dependency matrix depends on a second instruction represented in the dependency matrix. For example, control circuit 112 can encode a first dependency using an encoding scheme described herein.

The systems described herein may perform step 502 in a variety of ways. In one example, control circuit 112 can, after storing a newly received instruction in buffer 114, determine that this instruction depends on at least a second instruction (e.g., a source instruction) in buffer 114. Control circuit 112 can then encode this dependency using, for example, the partial encoding scheme (see FIG. 3) and/or the full encoding scheme (see FIG. 4) described herein.

As described herein, the partial encoding scheme can include dividing the set of instructions into groups and representing a source instruction of a dependency using a group value and an index value. The group value can correspond to a group containing the source instruction and the index value can correspond to the source instruction within the group. As described herein, the full encoding scheme can include representing a source instruction of a dependency using a location value that can correspond to an index location of the source instruction in the dependency matrix.

In some examples, the first instruction can depend on a third instruction in buffer 114 such that the first instruction can depend on two instructions (e.g., the second instruction and the third instruction). Control circuit 112 can encode a second dependency for the instruction, using the same or a different encoding scheme as used for encoding the first dependency. For example, as illustrated in FIGS. 3 and 4, row 1 (e.g., instruction 1) depends on rows 5 and 8. In some examples, the second dependency can be an update and/or portion of the first dependency.

Returning to method 500, at step 504 one or more of the systems described herein may store the encoded first dependency in the dependency matrix. For example, control circuit 112 can store the encoded first dependency in dependency matrix 116.

The systems described herein may perform step 504 in a variety of ways. In one example, control circuit 112 can store the encoded first dependency in dependency matrix 116 as part of a final step for encoding. In some examples, control circuit 112 can also store the encoded second dependency in dependency matrix 116. In such examples, control circuit 112 stores both dependencies in dependency matrix 116 as part of a process for encoding and/or storing all dependencies for the instruction.

At step 506 one or more of the systems described herein may dispatch the first instruction based at least on decoding one or more dependencies stored in the dependency matrix for the first instruction. For example, control circuit 112 can dispatch the first instruction based on decoding the dependencies in dependency matrix 116.

The systems described herein may perform step 506 in a variety of ways. In some examples, control circuit 112 can also dispatch the first instruction based on identifying a readiness of each of the decoded dependencies. A decoded dependency can be ready, for instance, when the corresponding instruction has completed loading data into the appropriate register(s). In some examples, control circuit 112 can decode, in the partial encoding scheme, an encoded dependency by identifying, using the group value, the group that contains the source instruction and identifying, using the index value, which instruction in the identified group corresponds to the source instruction. In some examples, control circuit 112 can decode, in the full encoding scheme, the encoded dependency by identifying, using the location value, the source instruction in buffer 114.

The systems and methods described herein provide encoding schemes that may reduce a size of a dependency matrix associated with an instruction buffer of a processor. Reducing the size of the dependency matrix may reduce an area as well as storage and wires into the storage that may be needed to implement the dependency matrix. In some examples, a reduced-size dependency matrix may allow increasing a size of the instruction buffer without exhausting available space in the processor. In addition, an encoding scheme may be selected based on timing considerations. Certain operations may, upon completion, broadcast a signal to wake up child operations. In some examples, the child operations may not necessarily wake up grandchild operations. A full encoding scheme may be appropriate for such examples. In other examples, operations (e.g., address generation operations, store operations, etc.) may not require broadcasting for waking up child operations. Timing may be critical in such examples, such that a partial encoding scheme may be more appropriate. In addition, the encoding schemes may be applicable to other matrices a processor may implement, particularly sparse matrices.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on a chip (SoCs), portions of one or more of the same, variations or combinations of one or more of the same, or any other suitable physical processor.

In addition, one or more of the elements described herein may transform data, physical devices, and/or representations of physical devices from one form to another. For example, one or more of the units recited herein may receive instruction data to be transformed, transform the instruction data, output a result of the transformation to queue instructions, use the result of the transformation to determine dependencies, and store the result of the transformation to track dependencies between instructions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   encoding, using an encoding scheme that encodes index locations into values, a first dependency indicating that a first instruction represented in a dependency matrix depends on a second instruction represented in the dependency matrix;
   storing the encoded first dependency in the dependency matrix; and
   dispatching the first instruction based at least on decoding one or more dependencies stored in the dependency matrix for the first instruction.

2. The method of claim 1, wherein the encoding scheme corresponds to a partial encoding scheme comprising dividing a set of instructions represented by the dependency matrix into groups and representing a source instruction of a dependency using a group value corresponding to a group containing the source instruction and an index value corresponding to the source instruction within the group.

3. The method of claim 2, wherein the decoding, in the partial encoding scheme, comprises:
   identifying, using the group value, the group that contains the source instruction; and
   identifying, using the index value, which instruction in the identified group corresponds to the source instruction.

4. The method of claim 1, wherein the encoding scheme corresponds to a full encoding scheme comprising representing a source instruction of a dependency using a location value corresponding to an index location of the source instruction in the dependency matrix.

5. The method of claim 4, wherein the decoding, in the full encoding scheme, comprises identifying, using the location value, the source instruction.

6. The method of claim 1, further comprising:
   encoding a second dependency indicating that the first instruction depends on a third instruction represented in the dependency matrix; and
   storing the encoded second dependency in the dependency matrix.

7. The method of claim 6, wherein the second dependency is encoded with a second encoding scheme different from the encoding scheme.

8. The method of claim 1, wherein the encoding scheme includes a special value indicating no dependency.

9. The method of claim 1, wherein dispatching the first instruction is further based on identifying a readiness of each of the decoded one or more dependencies.

10. A method comprising:
    storing a first instruction in a buffer for queueing instructions, wherein the first instruction depends on a second instruction in the buffer;
    encoding, using an encoding scheme that reduces a number of bits needed to represent one or more instructions from a set of instructions in the buffer by encoding index locations of the buffer into values, a first dependency indicating that the first instruction depends on the second instruction;
    storing the encoded first dependency in a dependency matrix; and
    dispatching the first instruction based at least on decoding one or more dependencies stored in the dependency matrix for the first instruction.

11. The method of claim 10, wherein the encoding scheme corresponds to a partial encoding scheme comprising dividing the set of instructions into groups and representing a source instruction of a dependency using a group value corresponding to a group containing the source instruction and an index value corresponding to the source instruction within the group.

12. The method of claim 11, wherein the decoding, in the partial encoding scheme, comprises:
    identifying, using the group value, the group that contains the source instruction; and
    identifying, using the index value, which instruction in the identified group corresponds to the source instruction.

13. The method of claim 10, wherein the encoding scheme corresponds to a full encoding scheme comprising representing a source instruction of a dependency using a location value corresponding to a buffer location of the source instruction in the buffer.

14. The method of claim 13, wherein the decoding, in the full encoding scheme, comprises identifying, using the location value, the source instruction.

15. The method of claim 10, further comprising:
    encoding a second dependency indicating that the first instruction depends on a third instruction in the buffer; and
    storing the encoded second dependency in the dependency matrix.

16. The method of claim 10, wherein the encoding scheme includes a special value indicating no dependency.

17. The method of claim 10, wherein an index location in the dependency matrix corresponds to a buffer location in the buffer.

18. A system comprising:
a physical memory; and
at least one physical processor comprising:
  a buffer for queueing instructions;
  a dependency matrix for tracking dependencies between instructions in the buffer; and
  a control circuit for identifying ready instructions in the buffer using the dependency matrix, the control circuit configured to:
    encode, using an encoding scheme that reduces a number of bits needed to represent one or more instructions from a set of instructions in the buffer by encoding index locations of the buffer into values, a first dependency indicating that a first instruction in the buffer depends on a second instruction in the buffer;
    store the encoded first dependency in the dependency matrix in an index location corresponding to a buffer location of the first instruction in the buffer; and
    dispatch the first instruction based at least on decoding one or more dependencies stored in the dependency matrix for the first instruction.

19. The system of claim 18, wherein:
the encoding scheme corresponds to a partial encoding scheme comprising dividing the set of instructions into groups and representing a source instruction of a dependency using a group value corresponding to a group containing the source instruction and an index value corresponding to the source instruction within the group; and
the decoding, in the partial encoding scheme, comprises:
identifying, using the group value, the group that contains the source instruction; and
identifying, using the index value, which instruction in the identified group corresponds to the source instruction.

20. The system of claim 18, wherein:
the encoding scheme corresponds to a full encoding scheme comprising representing a source instruction of a dependency using a location value corresponding to a buffer location of the source instruction in the buffer; and
the decoding, in the full encoding scheme, comprises identifying, using the location value, the source instruction.

* * * * *